United States Patent [19]

Lindner et al.

[11] Patent Number: 5,498,916
[45] Date of Patent: Mar. 12, 1996

[54] WEDGE AND SPRING ASSEMBLY FOR SECURING COILS IN ELECTROMAGNETS AND DYNAMOELECTRIC MACHINES

[75] Inventors: Melvin Lindner, Huntington; James G. Cottingham, Center Moriches, both of N.Y.

[73] Assignee: The United States of America as represented by the United States Department of Energy, Washington, D.C.

[21] Appl. No.: 200,340

[22] Filed: Feb. 23, 1994

[51] Int. Cl.$^6$ ................................................ H02K 3/487
[52] U.S. Cl. ............................................ 310/214; 310/218
[58] Field of Search .............................. 310/42, 214, 218, 310/262, 269; 336/210; 335/250; 29/596, 602.1, 606

[56] References Cited

U.S. PATENT DOCUMENTS

| | | | |
|---|---|---|---|
| 2,459,374 | 1/1949 | Goodrich | 175/356 |
| 2,764,802 | 7/1958 | Feiertag | 29/155 |
| 3,008,786 | 11/1961 | Costello | 310/214 |
| 3,021,443 | 2/1962 | Tamm | 310/190 |
| 3,514,647 | 5/1970 | Lipstein | 310/60 |
| 3,716,901 | 2/1978 | Bragg et al. | 29/149 |
| 4,118,646 | 10/1978 | Flemming et al. | 310/58 |
| 4,268,773 | 5/1981 | Beck et al. | 310/214 |
| 4,831,715 | 5/1989 | Witwer | 29/596 |
| 4,833,436 | 5/1989 | Martin et al. | 29/606 |
| 4,875,277 | 10/1989 | Martin et al. | 29/606 |
| 4,967,464 | 11/1990 | Stephens | 29/596 |

FOREIGN PATENT DOCUMENTS

| | | | |
|---|---|---|---|
| 2382122 | 10/1978 | France | 310/214 |
| 1584037 | 8/1990 | U.S.S.R. | 310/214 |

*Primary Examiner*—Clayton E. LaBalle
*Attorney, Agent, or Firm*—David A. Pascarella; Bradley W. Smith; William R. Moser

[57] ABSTRACT

A wedge and spring assembly for use in electromagnets or dynamoelectric machines having a housing with an axis therethrough and a plurality of coils supported on salient poles that extend radially inward from the housing toward the housing axis to define a plurality of interpole spaces. The wedge and spring assembly includes a nonmagnetic retainer spring and a nonmagnetic wedge. The retainer spring is formed to fit into one of the interpole spaces, and has juxtaposed ends defining between them a slit extending in a direction generally parallel to the housing axis. The wedge for insertion into the slit provides an outwardly directed force on respective portions of the juxtaposed ends to expand the slit so that respective portions of the retainer spring engage areas of the coils adjacent thereto, thereby resiliently holding the coils against their respective salient poles. The retainer spring is generally triangular shaped to fit within the interpole space, and the wedge is generally T-shaped.

14 Claims, 3 Drawing Sheets

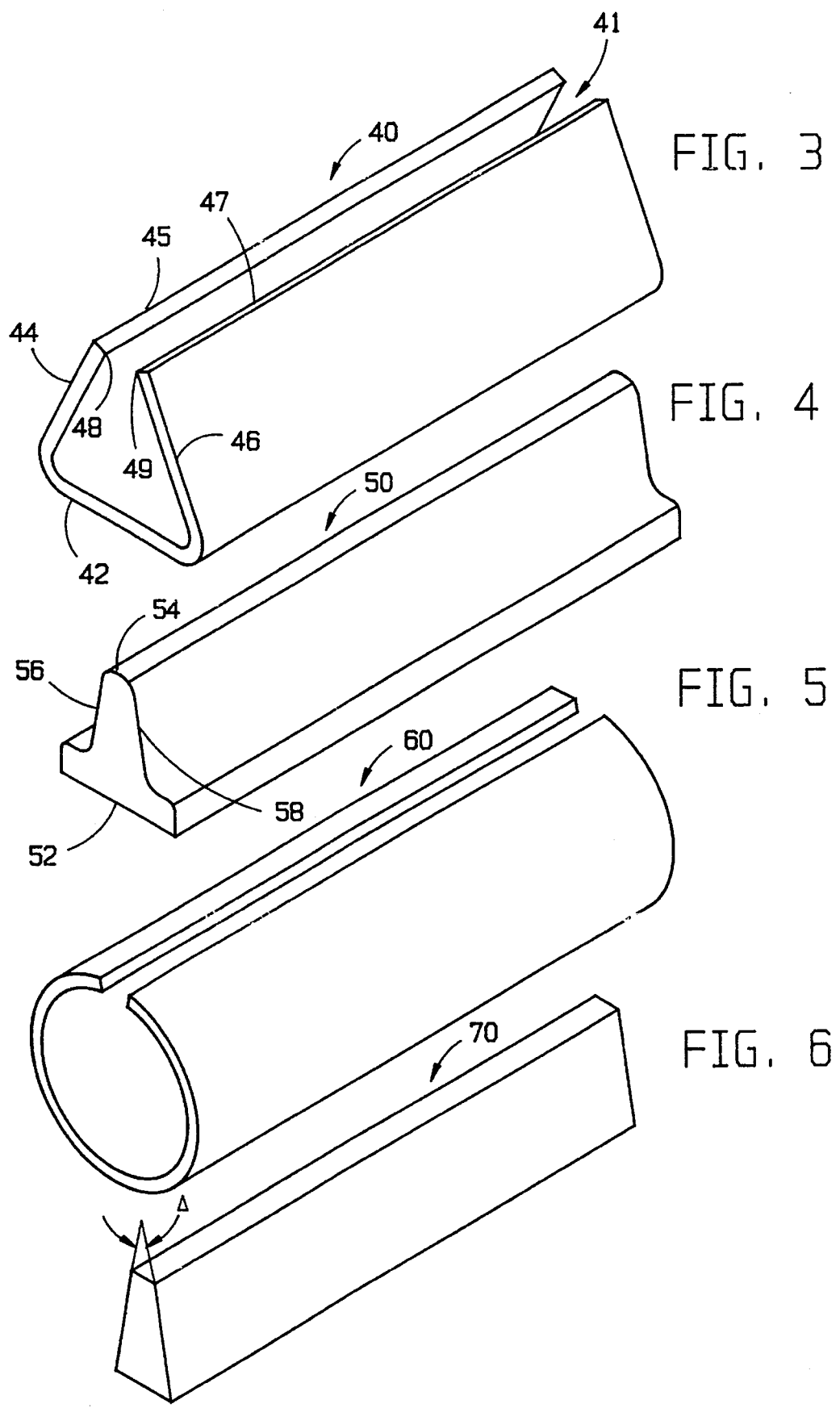

5,498,916

WEDGE AND SPRING ASSEMBLY FOR SECURING COILS IN ELECTROMAGNETS AND DYNAMOELECTRIC MACHINES

This invention was made with Government support under contract number DE-AC02-76CH00016, between the U.S. Department of Energy and Associated Universities, Inc. The Government has certain rights in the invention.

BACKGROUND OF THE INVENTION

The present invention relates generally to electromagnets and dynamoelectric machines. More particularly, this invention relates to a wedge and spring assembly for securing coils supported on salient poles in electromagnets and dynamoelectric machines.

Prior art devices for securing or retaining such coils which have a number of turns of wire used to produce a magnetic field and which are supported on salient poles in electromagnets and dynamoelectric machines having a plurality of circumferentially spaced and axially extending salient poles, have generally included mechanical fastening means or adhesive means. Typical mechanical fastening means include solid nonmagnetic spacers which are bolted to the magnet structure, e.g., a stator of a dynamoelectric machine.

Common adhesive fastening means for securing such coils onto associated salient poles include epoxies, which once cured become so rigid that it is virtually impossible to remove the coils from the salient poles for repair or replacement.

Another approach for retaining coils on salient poles is shown in U.S. Pat. No. 2,764,802 granted to Feiertag. Feiertag discloses a method for assembling a field coil on a stator which has stator poles consisting of layered segments extending circumferentially inward. In his method, a field coil is placed over a layered stator pole and a pair of longer segments of the pole are bent across the inner exposed surface of the field coil to form a C-channel within which the field coil is held in place. However, such a method does not resist the Lorentz forces generated in the coil due to electrons in the coil moving through electric and magnetic fields which during operation of electromagnets and dynamoelectric machines tend to force the coils away from the salient poles and toward the opening in the formed C-channel.

SUMMARY OF THE INVENTION

Accordingly, it is an object of the present invention to provide an improved wedge and spring assembly for resiliently holding in place the magnetic field producing electrical wire winding coils in electromagnets and dynamoelectric machines that have a plurality of coils supported on salient poles.

It is also an object of the present invention to provide such a wedge and spring assembly that is well suited for use in electromagnets, such as superconducting magnets used in particle accelerators, for resisting Lorentz forces generated in the coils which tend to force the coils away from their respective salient poles.

It is another object of the invention to provide such a wedge and spring assembly that can be readily and easily installed to securely hold coils in place on salient poles prior to and during operation of the associated electromagnets and dynamoelectric machines.

It is a further object of the invention to provide such a wedge and spring assembly that can be easily removed to permit quick repair or replacement of a defective coil, without the need for completely dissembling the coils or the electromagnet and dynamoelectric machine.

Another object of the invention is to provide such a wedge and spring assembly that is simple in construction and which may be manufactured relatively easily and inexpensively to facilitate its widespread use in electromagnets and dynamoelectric machines.

Certain of the foregoing and related objects are readily obtained in a wedge and spring assembly for use in electromagnets and dynamoelectric machines having a housing with an axis therethrough and a plurality of coils supported on salient poles that extend radially inward from the housing toward the housing axis to define a plurality of interpole spaces, respectively between the housing and adjacent coils, the interpole spaces each extending in a direction generally parallel to the housing axis. The wedge and spring assembly includes a nonmagnetic retainer spring and a nonmagnetic wedge. The retainer spring is formed to fit into one of the interpole spaces, and has juxtaposed ends defining between them a slit extending in a direction generally parallel to the housing axis. The wedge for insertion into the slit provides an outwardly directed force on respective portions of the juxtaposed ends defining the slit to expand the slit so that respective portions of the retainer spring engage areas of the coils adjacent thereto, thereby resiliently holding the coils against their respective salient poles.

In a preferred embodiment of the invention, the spring retainer and wedge are self-locking by the wedge being fabricated from a material softer than a material the retainer spring is fabricated from, so that the wedge is securely retained in the slit by the wedge being plastically deformed by the juxtaposed ends when the wedge is inserted into contact with the juxtaposed ends to expand the slit. Desirably, the retainer spring is generally triangular shaped to fit within the interpole space when viewed in cross-section transverse to the housing axis and is fabricated from heat treated beryllium-copper alloy. The wedge is generally T-shaped and fabricated from aluminum.

Certain of the foregoing and related objects are also readily obtained in a wedge and spring assembly essentially as described above, with a wedge having divergent sloped surfaces in which each surface and the respective juxtaposed ends of the retainer spring are angled relative to one another so that the wedge is securely retained in the slit by friction existing between its sloped surfaces and the juxtaposed ends of the retaining spring. Desirably, the retainer spring that is generally circular shaped to fit within the interpole space when viewed in cross-section transverse to the housing axis, and both the retainer spring and associated wedge are fabricated from a composite of fiberglass and epoxy.

BRIEF DESCRIPTION OF THE DRAWINGS

Other objects and features of the present invention will become apparent from the detailed description considered in connection with the accompanying drawings, which disclose several embodiments of the invention. It is to be understood that the drawings are used for the purpose of illustration only and not as a definition of the limits of the invention.

In the drawings, wherein similar reference characters denote similar elements throughout the several views:

FIG. 3 is a perspective view of a hollow axial triangular cross-sectional retainer spring such as is shown in FIGS. 1 and 2;

FIG. 4 is a perspective view of one of the T-shaped wedge as shown in FIGS. 1 and 2;

FIG. 5 is a perspective view of an alternative embodiment of retainer spring having a circular cross-section; and FIG. 6 is a perspective view of an alternative embodiment of a wedge having a trapezoidal cross-section for use with the retainer spring shown in FIG. 5.

DETAILED DESCRIPTION OF THE PREFERRED EMBODIMENTS

Figure 1:
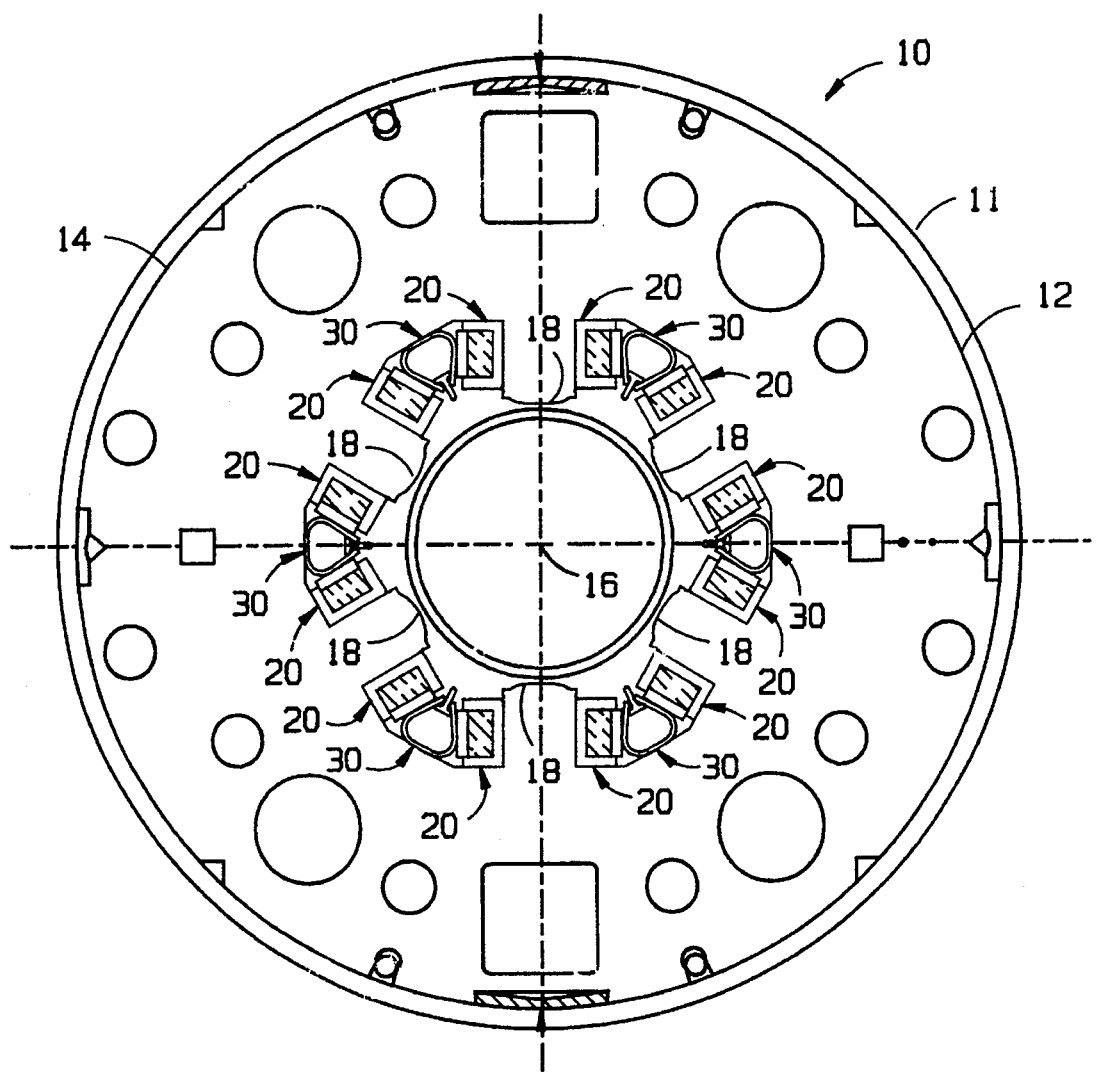
FIG. 1 is a cross-sectional view of a sextupole superconducting magnet showing six preferred wedge and spring assemblies of the present invention.

Turning now to the drawings, and in particular to FIG. 1, there is illustrated in cross-sectional view a sextupole superconducting magnet 10, and six wedge and spring assemblies 30 of the present invention. Magnet 10, is one of a number of different types of superconducting magnets designed and built for a particle accelerator called a Relativistic Heavy Ion Collider (RHIC), which will accelerate and collide beams of heavy ions (e.g., beams of the nuclei of gold atoms) at energies which range up to 100 GeV/u. Specifically, such magnets 10 are used for compensating for the natural chromaticity ($\chi$—42) of the collider and to correct for a related sextupole field generated in RHIC's dipole superconducting magnets. However, it is to be understood that wedge assemblies 30 of the present invention, although particularly suitable for securing coils in superconducting magnets which have a long axial length, the length extending axially along the magnet beam accelerating line, are also suitable for other magnetic machines, such as dynamoelectric machines that have a significantly shorter axial length. In addition, it is also to be understood that wedge assemblies 30 of the present invention for use in such motors and generators may have any number of salient poles.

Referring again to FIG. 1, magnet 10 has a housing 11 having two yoke halves 12 and 14 which are almost identical in detail and are made up of stacks of sheet steel laminations, each approximately 1/16 inch thick, and total an axial length of approximately 30 inches. In order to obtain the desired sextupole field about an axis or beam line 16, yoke halves 12 and 14 each contain three radially inwardly extending circumferentially spaced salient poles 18 with coil assemblies 20 mounted on them. In addition, adjacent coil assemblies 20 mounted on salient poles 18 define an interpole space in which wedge and spring assembly 30 is positioned. Coil assemblies 20 are electrically connected to provide the appropriate magnetic polarity required for magnet 10.

Figure 2:
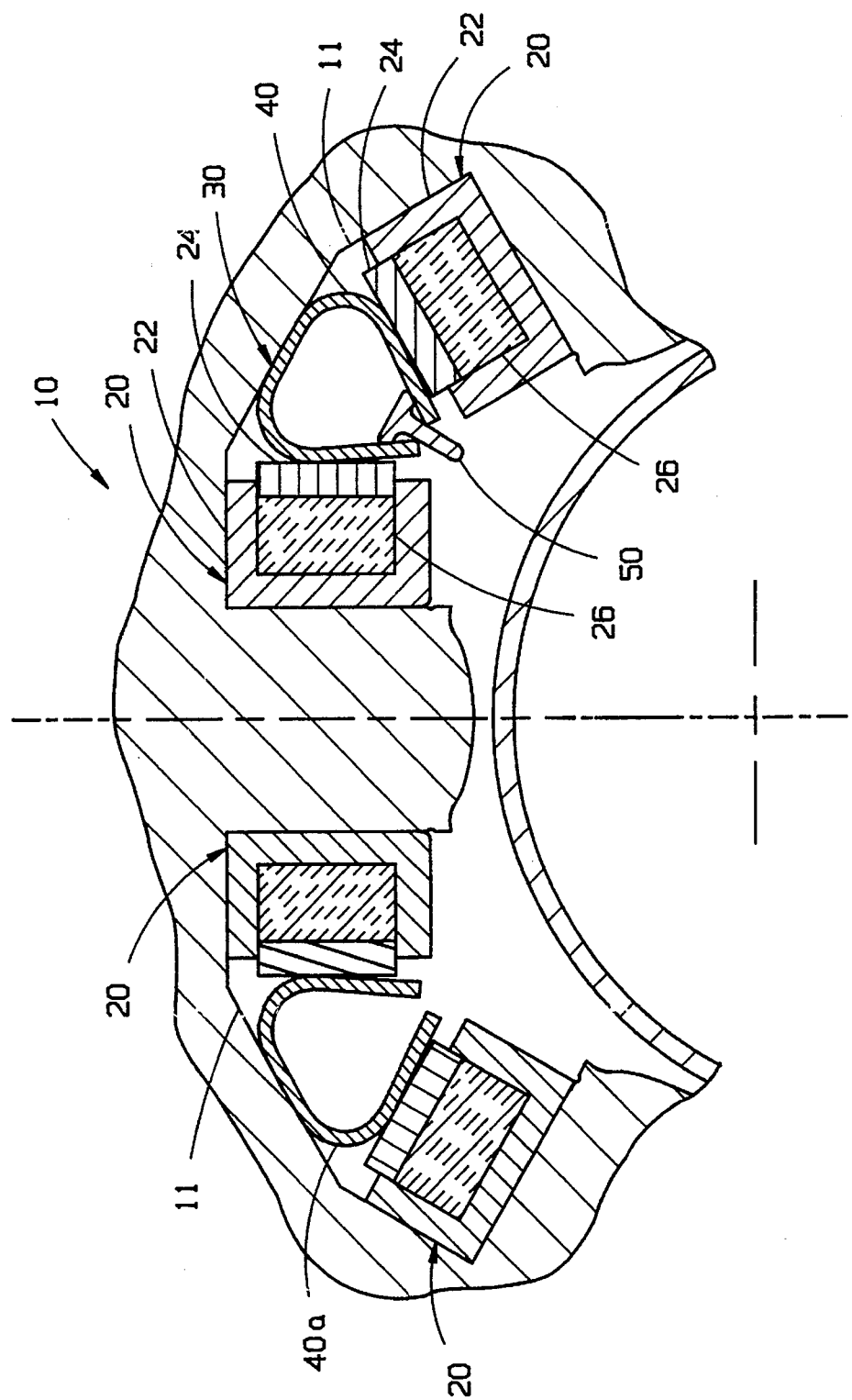
FIG. 2 is an enlarged cross-sectional view of a portion of the sextupole superconducting magnet of FIG. 1, showing in greater detail one preferred wedge and spring assembly having a triangular cross-sectional retainer spring and a T-shaped wedge, along with a second retainer spring that is illustrated prior to insertion of a wedge.

Referring now to FIG. 2, an enlarged cross-sectional view of a portion of magnet 10 is shown with wedge and spring assembly 30 shown in greater detail as having a retainer spring 40 and a wedge 50 positioned between two adjacent coil assemblies 20 on the right side of the Figure. Also shown in FIG. 2 is a retainer spring 40a positioned between adjacent coil assemblies 20 prior to insertion of a wedge. Wedge and spring assembly 30 is sized and configured for slidable insertion into an interpole space defined by adjacent coil assemblies 20 and housing 11. It will be seen that each coil assembly 20 includes a high temperature tolerant C-channel 22 made of epoxy, an insulator strip 24, and superconducting wire windings 26. In the construction of coil assemblies 20, windings 26 are suitably conventionally layer wound on mold forms that provide a close sliding fit with C-channel 22 which snugly surrounds respective salient poles 18 of housing 11.

Referring now to FIGS. 3 and 4, retainer spring 40 and wedge 50 are shown in greater detail. Retainer spring 40 has a hollow cross-section and an axially extending opening defining a slit 41. Specifically, retainer spring 0 is generally triangular shaped having a base 42 and two integral upwardly and inwardly extending sides 44, and 46 which approach each other at juxtaposed ends 45 and 47 of retainer spring 40 to define slit 41.

In electromagnetic or dynamoelectric machines having six salient poles, the triangular shape of retainer spring 40 will be essentially equilateral with each side of the triangle approximately equal in length and each of the three angles of the triangle being approximately 60°. Preferably, the retainer spring 40 is fabricated from a nonmagnetic material such as beryllium copper. As used in magnet 10, retainer spring 40 has a thickness of approximately 1/32 inch. Fabrication of retainer spring 40 includes roll forming an elongate flat sheet of beryllium copper to its desired triangular shape and heat treating it so that it is resiliently biased to retain its shape. It will be appreciated that other nonmagnetic metals and non-metals which do not interfere with the magnetic fields produced by the coils and salient poles, can alternatively be suitably employed.

Wedge 50 is generally T-shaped having a base 52 and an upwardly extending member 54 with opposite surfaces 56 and 58. Preferably, wedge 50 and spring retainer 40 are self-locking. Desirably, wedge 50 is fabricated from a material softer than the material used for fabricating retaining spring 40 so that wedge 50 remains securely retained in slit 41. Specifically, wedge 50 is securely retained in position in slit 41 by opposite surfaces 56 and 58 plastically deforming due to the force exerted by contact of edges 48 and 49 of spring ends 45 and 47 of retainer spring 40 when wedge 50 is inserted into contact with spring ends 45 and 47 to expand slit 41. A suitable material for wedge 50 is aluminum, however, other nonmagnetic materials can be equally employed. Although, opposite surfaces 56 and 58 can be divergently sloped with respect to each other, they need not be when the wedge is fabricated from a softer material than the material used for fabricating retaining spring.

Referring again to FIG. 2, wedge 50 is inserted inside retainer spring 40 and pressed into slit 41 to provide an outwardly directed force on spring ends 45 and 47 defining slit 41 so that respective portions of retainer spring 40 engages areas of adjacent coil assembly 20 to resiliently hold coil assemblies 20 securely on salient poles 18. Specifically, wedge and spring assembly 30 resiliently resists and is not deformed by the repeated Lorentz forces generated in coil assemblies 20 which tend to force coil assemblies 20 away from salient poles 18 toward interpole spaces defined by adjacent poles 18 and housing 11 during operation of magnet 10. At quench, where maximum current flows through superconducting wire windings 26, these forces can achieve a 80 kN/m at 45 degrees to the radial.

In an alternative embodiment of wedge and spring assembly 30, opposite surfaces 56 and 58 of wedge 50 can be divergent sloped in which each surface and respective spring ends 45 and 47 are angled relative to one another so that wedge 50 is securely retained in slit 41 by friction existing between sloped surfaces 56 and 58, and spring ends 45 and 47. The angle of the divergent sloped surfaces, $\Delta$, can vary from 0 degrees to a maximum value which will depend on the materials chosen for the wedge and spring retainer and the materials' respective coefficients of friction.

Referring to FIG. 5 and 6, an alternative embodiment is shown for a retaining spring 60 and a wedge 70. Retaining spring 60 has a circular cross-section and is fabricated from a composite of fiberglass and epoxy. Similarly, wedge 70 is fabricated from a composite of fiberglass and epoxy.

It will be appreciated that adhesives or other permanent means for locking or retaining wedge 50 in slot 48 can be equally employed.

Wedge 50 is installed along the length of slit 41 from the inside of retainer spring 40 by applying force to base 52. Such installation can be accomplished by sliding a ball-ended tool between the base 52 of wedge 50 and the inside surface of base 42 of retainer spring 40. Removal of wedge assembly 20 is easily accomplished by applying a reverse force on the top of member 54 of wedge 50 (i.e., force directed inward toward the base 42 of retainer spring 40) at one end of its axial length and translating the force to the other end. An important aspect of wedge and spring assembly 30 in that it enables installation or removal of the coil assemblies 20, such as for repair, without having to completely open and disassemble the yokes of magnet 10, separating yokes 12 and 14, but instead permits convenient access along the axial length of magnet 10.

Although it is preferred that a wedge assembly is used between each adjacent circumferentially spaced and axially extending coil supported on a salient pole in electromagnets or dynamoelectric machines consists of a single coil retainer and a single wedge extending along the complete axial length of the magnet, it is observed that a combination of a plurality of coil retainers and wedges can be equally employed.

While only several embodiments of the present invention have been shown and described, it is obvious that many changes and modification may be made relative thereto without departing from the spirit and scope of the invention.

We claim:

1. A wedge and spring assembly for use in electromagnets or dynamoelectric machines having a housing with an axis therethrough and a plurality of coils supported on salient poles that extend radially inward from the housing toward the housing axis to define a plurality of interpole spaces, respectively between the housing and adjacent coils, the interpole spaces each extending in a direction generally parallel to the housing axis, comprising:

at least one nonmagnetic retainer spring formed to fit into one of the interpole spaces, said retainer spring having juxtaposed ends defining between them a slit extending in a direction generally parallel to the housing axis;

at least one nonmagnetic wedge for insertion into said slit to provide an outwardly directed force on respective portions of said juxtaposed ends defining said slit to expand said slit, deforming said spring, so that respective portions of said retainer spring engage areas of the coils adjacent thereto, thereby to resiliently hold the coils against their respective salient poles and where said deformed spring holds said wedge in place.

2. A wedge and spring assembly for use in electromagnets or dynamoelectric machines having a housing with an axis therethrough and a plurality of coils supported on salient poles that extend radially inward from the housing toward the housing axis to define a plurality of interpole spaces, respectively between the housing and adjacent coils, the interpole spaces each extending in a direction generally parallel to the housing axis, comprising:

at least one nonmagnetic retainer spring formed to fit into one of the interpole spaces, said retainer spring having juxtaposed ends defining between them a slit extending in a direction generally parallel to the housing axis;

at least one nonmagnetic wedge for insertion into said slit to provide an outwardly directed force on respective portions of said juxtaposed ends defining said slit to expand said slit so that respective portions of said retainer spring engage areas of the coils adjacent thereto, thereby to resiliently hold the coils against their respective salient poles;

wherein said retainer spring and said wedge are self-locking; and wherein said wedge is fabricated from a material softer than a material said retainer spring is fabricated from, so that said wedge is securely retained in said slit by said wedge being plastically deformed by said juxtaposed ends when said wedge is inserted into contact with said juxtaposed ends to expand said slit.

3. The wedge and spring assembly according to claim 2, wherein said retainer spring is generally triangular shaped to fit within the interpole space when viewed in cross-section transverse to the housing axis.

4. The wedge and spring assembly according to claim 3, wherein said wedge is generally T-shaped.

5. The wedge and spring assembly according to claim 4, wherein said retainer spring is fabricated from beryllium-copper alloy and is heat treated sufficiently to resiliently retain its triangular shape.

6. The wedge and spring assembly according to claim 5, wherein said wedge is fabricated from aluminum.

7. A wedge and spring assembly for use in electromagnets or dynamoelectric machines having a housing with an axis therethrough and a plurality of coils supported on salient poles that extend radially inward from the housing toward the housing axis to define a plurality of interpole spaces, respectively between the housing and adjacent coils, the interpole spaces each extending in a direction generally parallel to the housing axis, comprising:

at least one nonmagnetic retainer spring formed to fit into one of the interpole spaces, said retainer spring having juxtaposed ends defining between them a slit extending in a direction generally parallel to the housing axis;

at least one nonmagnetic wedge for insertion into said slit to provide an outwardly directed force on respective portions of said juxtaposed ends defining said slit to expand said slit so that respective portions of said retainer spring engage areas of the coils adjacent thereto, thereby to resiliently hold the coils against their respective salient poles;

wherein said retainer spring and said wedge are self-locking;

wherein said wedge includes divergent sloped surfaces in which each surface and said respective juxtaposed ends of said retainer spring are angled relative to one another so that said wedge is securely retained in said slit by friction existing between its sloped surfaces and said juxtaposed ends of said retaining spring; and wherein said retainer spring is generally circular shaped to fit within the interpole space when viewed in cross-section traverse to the housing axis.

8. The wedge and spring assembly according to claim 7, wherein said retainer spring is fabricated from a composite of fiberglass and epoxy.

9. The wedge and spring assembly according to claim 8, wherein said wedge is fabricated from a composite of fiberglass and epoxy.

10. A wedge and spring assembly for use in electromagnets or dynamoelectric machines having a housing with an axis therethrough and a plurality of coils supported on a plurality of salient poles that extend radially inward from the housing toward the housing axis to define a plurality of interpole spaces, respectively between the housing and adjacent coils, the interpole spaces each extending in a direction generally parallel to the housing axis, comprising:

at least one nonmagnetic retainer spring shaped to a specific contour to fit into one of the interpole spaces where said contour defines a cross sectional area with a spring axis perpendicular to said cross sectional area, said retainer spring having juxtaposed ends defining between them a slit having a specified width and extending in a direction generally parallel to said spring axis and where said contour is continuous except for a void created by said slit; and at least one nonmagnetic wedge for insertion into said slit where said wedge has a base coupled to a flange where said flange has a thickness which is greater than said slit width to provide an outwardly directed force on respective portions of said juxtaposed ends defining said slit thereby expanding said slit when said flange of said wedge engages said juxtaposed ends so that respective portions of said retainer spring engage areas of the coils adjacent thereto, thereby to resiliently hold the coils against their respective salient poles and where an interaction between said spring and said wedge serve to hold said wedge in place.

11. The wedge and spring assembly according to claim 10, wherein said flange of said wedge has sloped surfaces which converge away from said base and where said surfaces and said respective juxtaposed ends of said retainer spring are similarly angled relative to one another so that said wedge is securely retained in said slit by friction existing between its sloped surfaces and said juxtaposed ends of said retaining spring.

12. The wedge and spring assembly according to claim 11, wherein said thickness of said flange in contact with said base corresponds in size to said base.

13. The wedge and spring assembly according to claim 10, wherein said retainer spring and said wedge are self-locking.

14. The wedge and spring assembly according to claim, 10, wherein said retainer spring is generally circular shaped to fit within the interpole space when viewed in cross-section traverse to the housing axis.

* * * * *